(12) United States Patent
    Maitre

(10) Patent No.: US 12,403,823 B2
(45) Date of Patent: Sep. 2, 2025

(54) SYSTEMS AND METHODS FOR INDICATING A VEHICLE VIRTUAL CONNECTION

(71) Applicant: Toyota Motor Engineering & Manufacturing North America, Inc., Plano, TX (US)

(72) Inventor: Lisa Maitre, Milford, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 18/322,787

(22) Filed: May 24, 2023

(65) Prior Publication Data
   US 2024/0391380 A1    Nov. 28, 2024

(51) Int. Cl.
   *B60Q 1/50* (2006.01)
   *B60Q 5/00* (2006.01)

(52) U.S. Cl.
   CPC ............ *B60Q 1/543* (2022.05); *B60Q 5/005* (2013.01); *B60Q 2400/50* (2013.01)

(58) Field of Classification Search
   None
   See application file for complete search history.

(56) References Cited

U.S. PATENT DOCUMENTS

| | | | |
|---|---|---|---|
| 9,165,470 B2 | 10/2015 | Mudalige et al. | |
| 10,309,791 B2 | 6/2019 | Rajab et al. | |
| 10,339,815 B1 | 7/2019 | Sin | |
| 2008/0134955 A1* | 6/2008 | Morrow | G09F 21/04 |
| | | | 116/28 R |
| 2018/0251153 A1 | 9/2018 | Li et al. | |
| 2019/0016255 A1* | 1/2019 | Damon | F21S 43/13 |
| 2019/0054922 A1* | 2/2019 | Yalla | B60W 10/20 |
| 2019/0206262 A1* | 7/2019 | Sin | B60Q 1/1423 |
| 2020/0193837 A1* | 6/2020 | Grolle | B60Q 1/543 |

(Continued)

FOREIGN PATENT DOCUMENTS

| | | |
|---|---|---|
| CN | 104369736 A | 2/2015 |
| CN | 110070754 A | 7/2019 |
| KR | 101501360 B1 | 1/2015 |

OTHER PUBLICATIONS

Wilschut et al. "Adaptive Virtual Tow Bar and Transition of Control: A truck driving simulator study." Soesterberg: TNO, Nov. 2016.

*Primary Examiner* — John F Mortell
(74) *Attorney, Agent, or Firm* — Christopher G. Darrow; Darrow Mustafa PC

(57) ABSTRACT

System, methods, and other embodiments described herein relate to indicating a vehicle virtual connection to users in an environment surrounding the virtually-connected vehicles. In one embodiment, a system includes a processor and a memory storing machine-readable instructions that, when executed by the processor, cause the processor to 1) detect that a first vehicle and a second vehicle are in a virtual connection mode and 2) based on the first vehicle and the second vehicle being in the virtual connection mode, control an exterior lighting element of the first vehicle to illuminate in a particular pattern and in coordination with the second vehicle to indicate a virtual connection between the first vehicle and the second vehicle.

10 Claims, 5 Drawing Sheets

(56) References Cited

U.S. PATENT DOCUMENTS

2021/0094464 A1\* 4/2021 Aono ................. B60Q 1/507
2021/0291732 A1\* 9/2021 Woo .................. H04W 4/46
2021/0370822 A1 12/2021 Selevan et al.

\* cited by examiner

SYSTEMS AND METHODS FOR INDICATING A VEHICLE VIRTUAL CONNECTION

TECHNICAL FIELD

The subject matter described herein relates, in general, to virtually-connected vehicles and, more particularly, to indicating a virtual vehicular connection to users in an environment surrounding the virtual connection.

BACKGROUND

In a hitched configuration, a trailer or another wheeled object is physically coupled to a motorized vehicle such that the motorized vehicle pulls the trailer or other wheeled object along and behind the motorized vehicle. Two vehicles may be joined in a hitchless towing or a virtual connection configuration. In a hitchless/virtual towing configuration, a lead vehicle is manually or autonomously controlled, while a following vehicle is at least partially controlled by the lead vehicle. The following vehicle trails the lead vehicle as if physically coupled to the lead vehicle. Platooning is another configuration in which multiple vehicles maneuver in a coordinated fashion. A vehicle at the front of the platoon controls the speed and/or maneuvers of the other vehicles.

SUMMARY

In one embodiment, example systems and methods relate to a manner of indicating a virtual vehicular connection by coordinating the illumination of an exterior lighting element of a first vehicle to align with the illumination of an exterior lighting element of a second vehicle.

In one embodiment, a light control system includes one or more processors and a memory communicably coupled to the one or more processors. The memory stores a control module including instructions that, when executed by the one or more processors, cause the one or more processors to detect that a first vehicle and a second vehicle are in a virtual connection mode and, based on the first vehicle and the second vehicle being in the virtual connection mode, control an exterior lighting element of the first vehicle to illuminate in a particular pattern and in coordination with the second vehicle to indicate a virtual connection between the first vehicle and the second vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
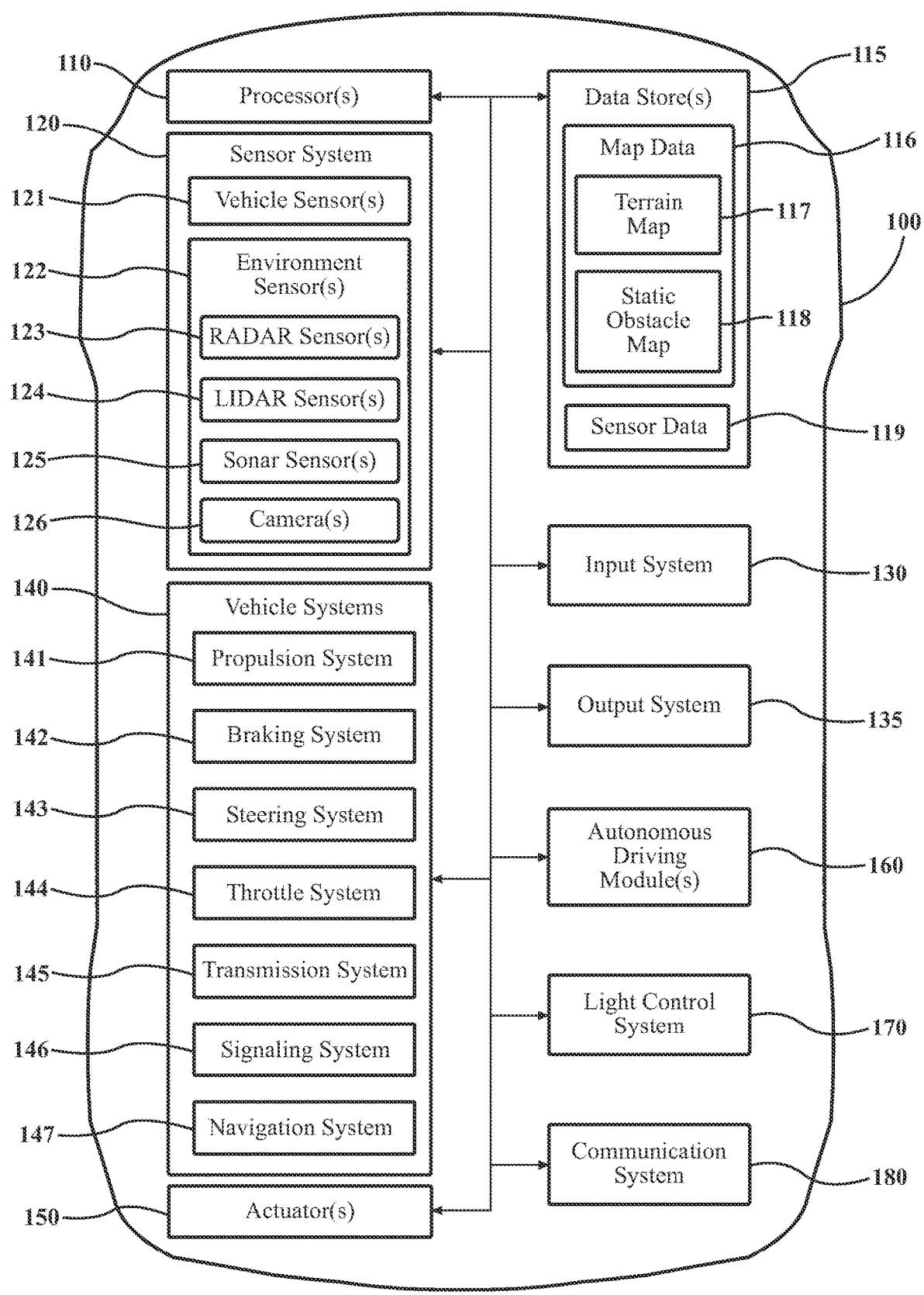
FIG. 1 illustrates one embodiment of a vehicle within which systems and methods disclosed herein may be implemented.

Systems, methods, and other embodiments associated with indicating a virtual vehicular connection by controlling exterior lighting elements of vehicles in the virtual connection are disclosed herein. In a virtual connection configuration, which may include a hitchless towing, a virtual towing, or a platooning configuration, a lead vehicle is manually or autonomously controlled, while a following vehicle is at least partially controlled by the lead vehicle. That is, the following vehicle may trail the lead vehicle as if physically coupled to the lead vehicle. Other road users, such as motorists and pedestrians, may be confused by, or unfamiliar with, this virtual connection configuration. That is, it may not be apparent to other road users that the lead vehicle and the following vehicle are virtually connected and synchronously moving. The lack of awareness and unfamiliarity with the virtual connection configuration may lead to an undesirable and potentially unsafe situation. For example, another vehicle may attempt to position itself between the lead vehicle and the following vehicle. Similarly, a pedestrian, thinking they have the right of way, may pass between the lead vehicle and the following vehicle, expecting the following vehicle to stop. Accordingly, the present specification describes a light control system in at least one vehicle in the virtual connection. The light control system manipulates the exterior lighting elements of the vehicle to indicate to the surrounding environment of the virtual connection between the two vehicles.

In one example, the light control system may coordinate vehicle lighting elements (e.g., the headlamps, taillamps, etc.) to indicate that the vehicles are in a hitchless towing, a virtual towing, or a platooning configuration. The coordination of the exterior lighting elements may include controlling the exterior lighting elements to emanate light in a manner that is uniquely associated with the virtual connection. For example, the light control system may control the exterior lighting elements to emanate light with a particular color or strobing pattern uniquely associated with the virtual connection. The light control system may coordinate the illumination of any of the multiple exterior lights found on a vehicle, including headlighting elements, tail lighting elements, undercarriage lights, side panel displays, front panel displays, and any other vehicle exterior lighting element.

In one particular example, the light control system may control a projector mounted on a first virtually-connected vehicle to project the indication onto the body of another vehicle in the virtual connection. For example, a projected light beam pattern, an alphanumeric or symbolic indication, navigation instructions, or other content may be projected from one vehicle to another to 1) indicate the virtual connection and 2) provide additional information associated with the virtual connection.

In one specific approach, the light control system controls an external display on a vehicle to indicate that the vehicle is virtually connected to another vehicle. For example, displays on one or multiple virtually-connected vehicles may show a phrase, such as "connected," to indicate that the vehicles are operating in a virtual connection mode. As another example, a continuous message may scroll across the side panel displays of the different vehicles in the virtual connection. In one example, in addition to visual indicators, the system may control audio devices of the vehicles to emit sounds that show the following vehicle and lead vehicle are in a hitchless towing, virtual towing, platooning, or other virtual connection configuration.

As such, the present light control system informs users within an environment surrounding the virtually-connected vehicles, that the vehicles are traveling as a cohesive unit to reduce the confusion of the surrounding pedestrians and motorists. That is, users in the environment observe the virtually-connected vehicles and the specific indicium provided by the light control system and acknowledge the virtual connection. The increased awareness of the virtual connection provided by the light control system reduces the likelihood of potentially unsafe or undesirable conditions.

As used in the present specification and in the appended claims, the term "exterior lighting element" refers to any of the exterior lighting elements of the vehicle such as a headlight, a taillight, a left-turn light, a right-turn light, and a reverse light as well as supplementary lighting elements such as a projector that is mounted to the exterior of the vehicle, undercarriage lights, a front panel display, and a side panel display, among others.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with controlling exterior lighting elements to announce or indicate that two or more vehicles are virtually connected. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a light control system 170 that is implemented to perform methods and other functions as disclosed herein relating to improving notification of a virtual connection configuration between a lead vehicle and a following vehicle. As will be discussed in greater detail subsequently, the light control system 170, in various embodiments, is implemented partially within the vehicle 100, and as a cloud-based service. For example, in one approach, functionality associated with at least one module of the light control system 170 is implemented within the vehicle 100 while further functionality is implemented within a cloud-based computing system.

Figure 2:
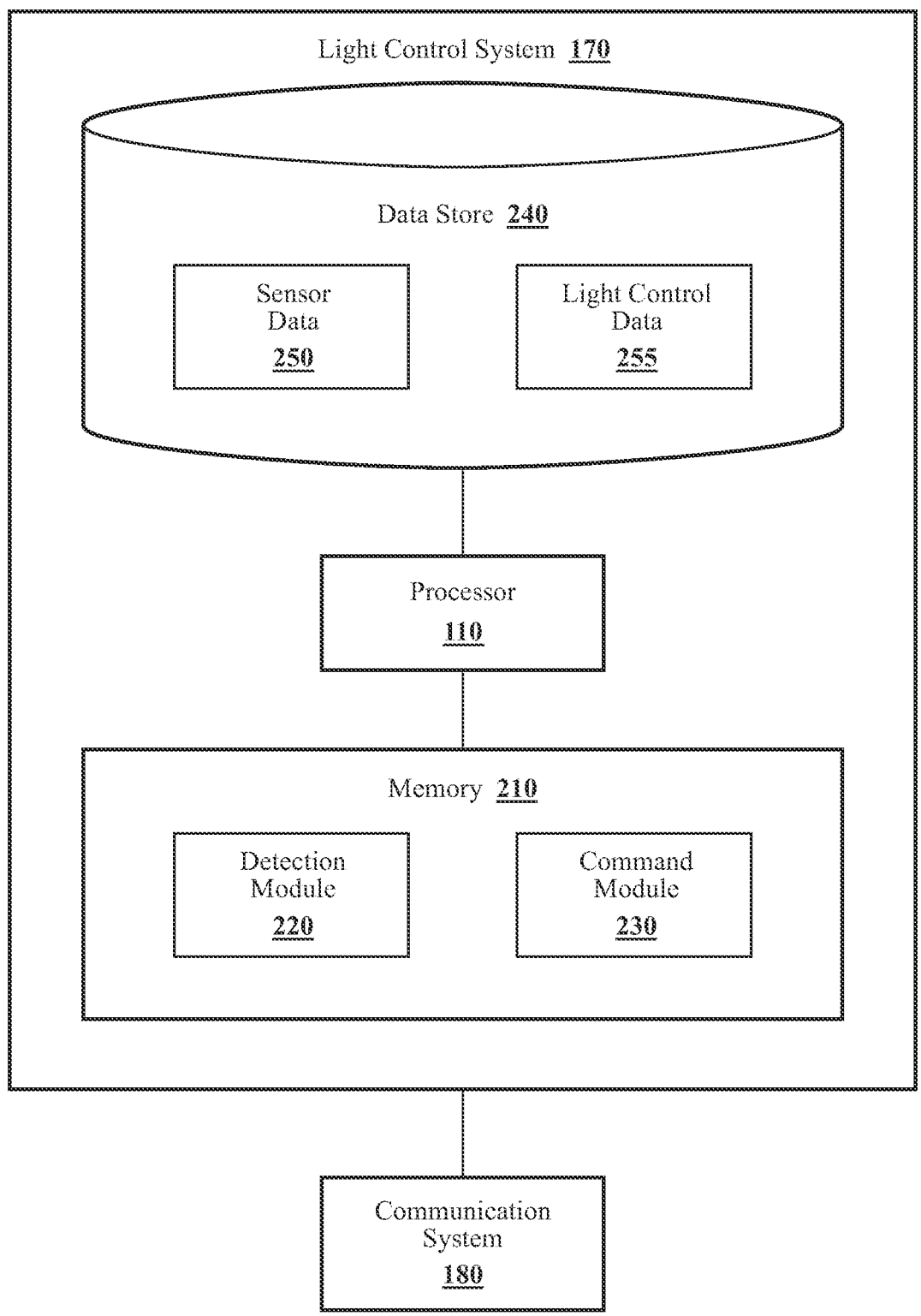
FIG. 2 illustrates one embodiment of a light control system that indicates a virtual connection.

With reference to FIG. 2, one embodiment of the light control system 170 of FIG. 1 is further illustrated. The light control system 170 is shown as including a processor 110 from the vehicle 100 of FIG. 1. Accordingly, the processor 110 may be a part of the light control system 170, the light control system 170 may include a separate processor from the processor 110 of the vehicle 100, or the light control system 170 may access the processor 110 through a data bus or another communication path. In one embodiment, the light control system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the processor 110, cause the processor 110 to perform the various functions disclosed herein.

Figure 4:
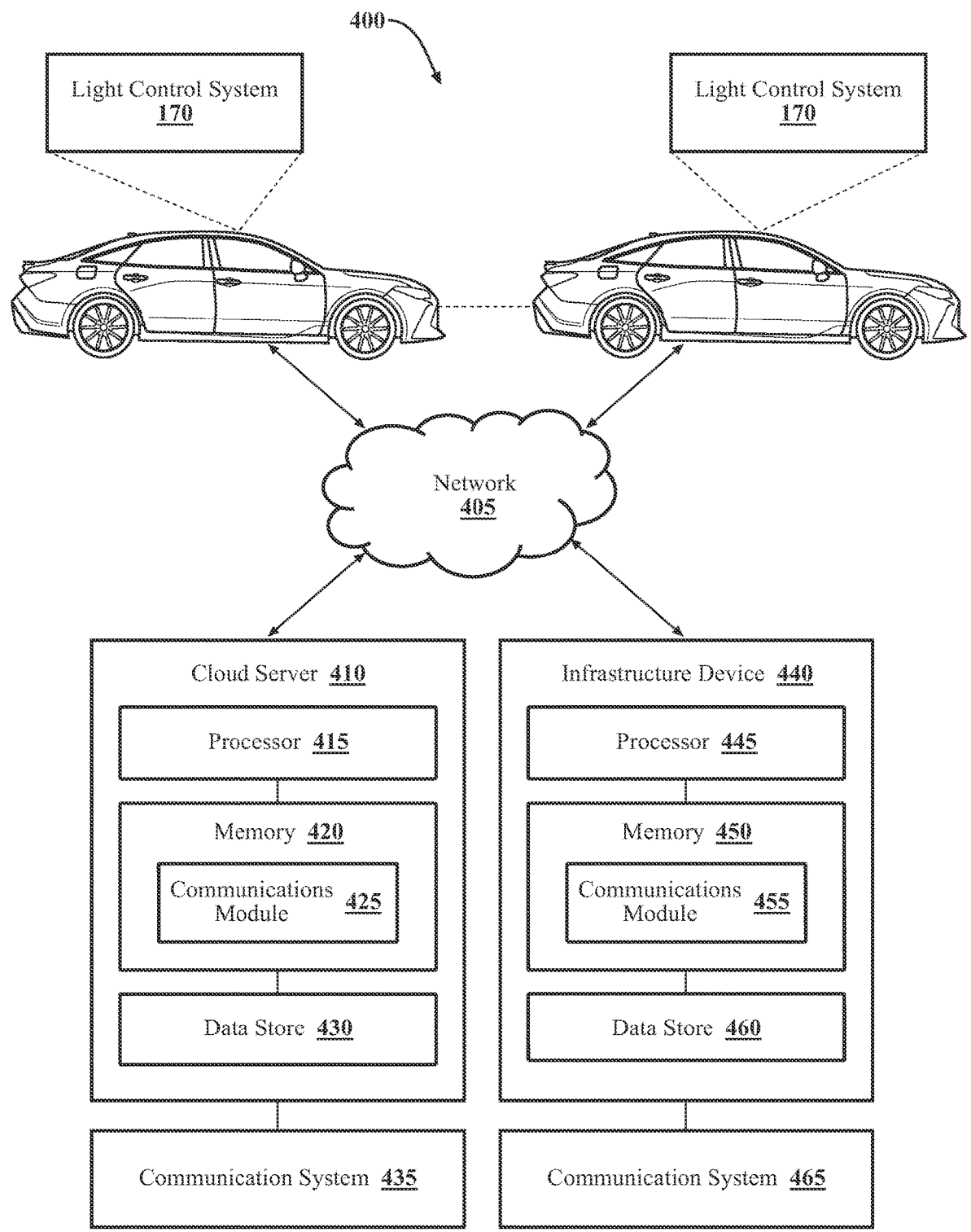
FIG. 4 illustrates one embodiment of the light control system of FIG. 2 in a cloud-computing environment.

The light control system 170 as illustrated in FIG. 2 is generally an abstracted form of the light control system 170 as may be implemented between the vehicle 100 and a cloud-computing environment. FIG. 4 illustrates one example of a cloud-computing environment 400 that may be implemented along with the light control system 170. As illustrated in FIG. 4, the light control system 170 may be embodied at least in part within the cloud-computing environment 400.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar sensor 123, a LIDAR sensor 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the light control system 170 includes the data store 240. The data store 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterizes various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 240 further includes light control data 255 and metadata that characterizes various aspects of the light control data 255. Light control data 255 refers to the data by which the command module 230 controls the exterior lighting elements of the vehicle 100. As described above, the light control system 170 manipulates the exterior lighting elements of the vehicle 100 to indicate the virtual connection to pedestrians and other motorists. The light control system 170 may control the exterior lighting elements in many ways, for example, by controlling strobing parameters, a color pattern of the illuminated light, and/or any other illumination characteristics. As such, the light control data 255 includes the illumination parameters to be used given a detected virtual connection. While particular reference is made to particular illumination parameters that are stored as light control data 255, other illumination parameters and associated metadata may be stored therein.

The detection module 220, in one embodiment, is further configured to perform additional tasks beyond controlling the respective sensors to acquire and provide the sensor data 250. For example, the detection module 220 includes instructions that cause the processor 110 to detect that a first vehicle and a second vehicle are in a virtual connection mode. That is, to effectuate the virtual connection between the first vehicle and the second vehicle, a communication path is set up between the two such that one vehicle, i.e., the lead vehicle, can provide driving and other commands to the second vehicle in the virtual connection. The detection module 220 detects that the first vehicle and a second vehicle are in a virtual connection mode in any number of ways. For example, the detection module 220 may identify the existence of the communication path between the first vehicle and the second vehicle. In another example, vehicles that are in the virtual connection mode may be set to certain operational states. In this example, the detection module 220 identifies the operational state of the vehicle 100 as indicia of the vehicle 100 being in the virtual connection mode. The virtual connection mode differs from a non-virtual connection mode in that while in a non-virtual connection mode, the vehicle 100 does not command another vehicle, nor is it commanded by another vehicle.

In one embodiment, the command module 230 generally includes instructions that function to control the processor 110 or collection of processors in the cloud-computing environment 400 to control an exterior lighting element of the first vehicle. Specifically, the command module 230 causes the exterior lighting elements to illuminate in a particular pattern and in coordination with the second vehicle to indicate a virtual connection between the first vehicle and the second vehicle. Such control is based on the first and second vehicles being in the virtual connection modes. That is, the command module 230 relies on an output from the detection module 220 that indicates the presence of the virtual connection to control the exterior lighting element to indicate the virtual connection. In general, the command module 230 generates light control signals for any one, or multiple, of the exterior lighting elements that may be found on the vehicle 100. For example, the vehicle 100 may include headlights, taillights, left-turn lights, right-turn lights, and reverse lights, among others. The command module 230, based on the detected virtual connection mode of the vehicle 100, activates any combination of these exterior lighting elements in a coordinated fashion with the exterior lighting elements of the other vehicle in the virtual connection.

In addition to these exterior lighting elements, the vehicle 100 may include other exterior lighting elements or displays such as undercarriage lights, a projector, a front display panel, and/or a side display panel. The light control system 170 may similarly control these other exterior lighting elements in coordination with the exterior lights of the other vehicle in the virtual connection.

The command module 230 may control different aspects of the operation of the exterior lighting element. For example, the command module 230 may activate the exterior lighting element to emanate a color uniquely associated with the virtual connection. As a particular example, a headlight, taillight, or another lighting element, when not in the virtual connection mode, may illuminate a first color. Responsive to a detected virtual connection mode of the vehicle 100, the light control system 170 may alter the illumination of this particular exterior lighting element to emanate a color that is different from the first color and that is also uniquely associated with the virtual connection. As another example, the command module 230 may activate the exterior lighting element to emanate a patterned beam uniquely associated with the virtual connection.

Note that while particular reference is made to particular illumination parameters, the command module 230 may alter other illumination parameters, such as a strobing frequency, a brightness parameter, and an illumination sequence, among others, such that the exterior lighting elements identify the virtual connection. As such, in this example, the command module 230 alters the default illumination parameters of an exterior lighting element to illuminate in a fashion that uniquely identifies the virtual connection.

As a particular example of an exterior lighting element, the vehicle 100 may include a projector that projects an image, or series of images, onto a surface. In this example, the projection surface may be the other vehicle in the virtual connection. For example, the vehicle 100, which may be a lead vehicle in a virtual connection or a following vehicle in a virtual connection, may project an image indicative of the virtual connection onto the other vehicle in the virtual connection. In the example where the vehicle is the lead vehicle, the projected surface may be the hood of the second vehicle. In the example where the vehicle is the following vehicle, the projected surface may be a trunk, or rear-facing body panel, of the lead vehicle.

The projected indication may take a variety of forms. In one example, the projection is a symbolic indication of the virtual connection. More specifically, the projection may be an image indicative of the virtual connection or an alphanumeric indication of the virtual connection. Examples of projected images include a logo, an icon, a graphic, or any other type of identifying image. Examples of projected textual indications include the words "virtual connection," "connected," or other textual phrase or word. While particular reference is made to specific image and textual-based projections, other types of graphic or textual indicia may be projected onto the second vehicle.

In one example, the command module 230 may cause the processor 110 to project navigational instructions onto the second vehicle. For example, a lead vehicle in a virtual connection may receive routing information from the navigation system 147. The routing information may include upcoming driving maneuvers and other route-based information presented on a lead vehicle display. In this example, the navigation instructions are projected either from the lead vehicle onto the hood surface of the following vehicle or from the following vehicle onto a rear-facing body panel of the lead vehicle. As such, pedestrians and motorists would not only be aware of the presence of a virtual connection but also be able to ascertain upcoming movements of the virtually-connected vehicles.

In one example, the projection may replicate a heads-up display (HUD) of the first vehicle onto the second vehicle. Some vehicles may include a HUD, which projects virtual objects onto a transparent surface (e.g., a windshield). For example, the HUD may project any number of virtual elements, such as boxes surrounding identified users, on the windshield. In this example, the projection from the lead vehicle onto the following vehicle or from the following vehicle to the lead vehicle may be a replication of the contents of the HUD.

In some examples, in addition to generating light command signals, the command module 230 may generate control signals for additional output devices. For example, the command module 230 may generate an audible signal to announce the virtual connection. In this example, the audible signal may be coordinated with the particular pattern of the exterior lighting element to supplement the visual indicia with an audible cue of the virtual connection.

The output of the command module 230 is transmitted to the various exterior lighting elements through the communication system 180, which includes wired, wireless, or other communication buses that connect the light control system 170 and the exterior lighting elements.

As such, the light control system 170 detects when a first vehicle is in a virtual connection mode, that is when the first vehicle is virtually connected to a second vehicle. When the first vehicle is in a virtual connection mode, the light control system 170 controls an exterior lighting element of the first vehicle to indicate the virtual connection. Doing so brings the virtual connection to the attention of users near the virtually-connected vehicles to ensure the safety of those users.

Figure 3:
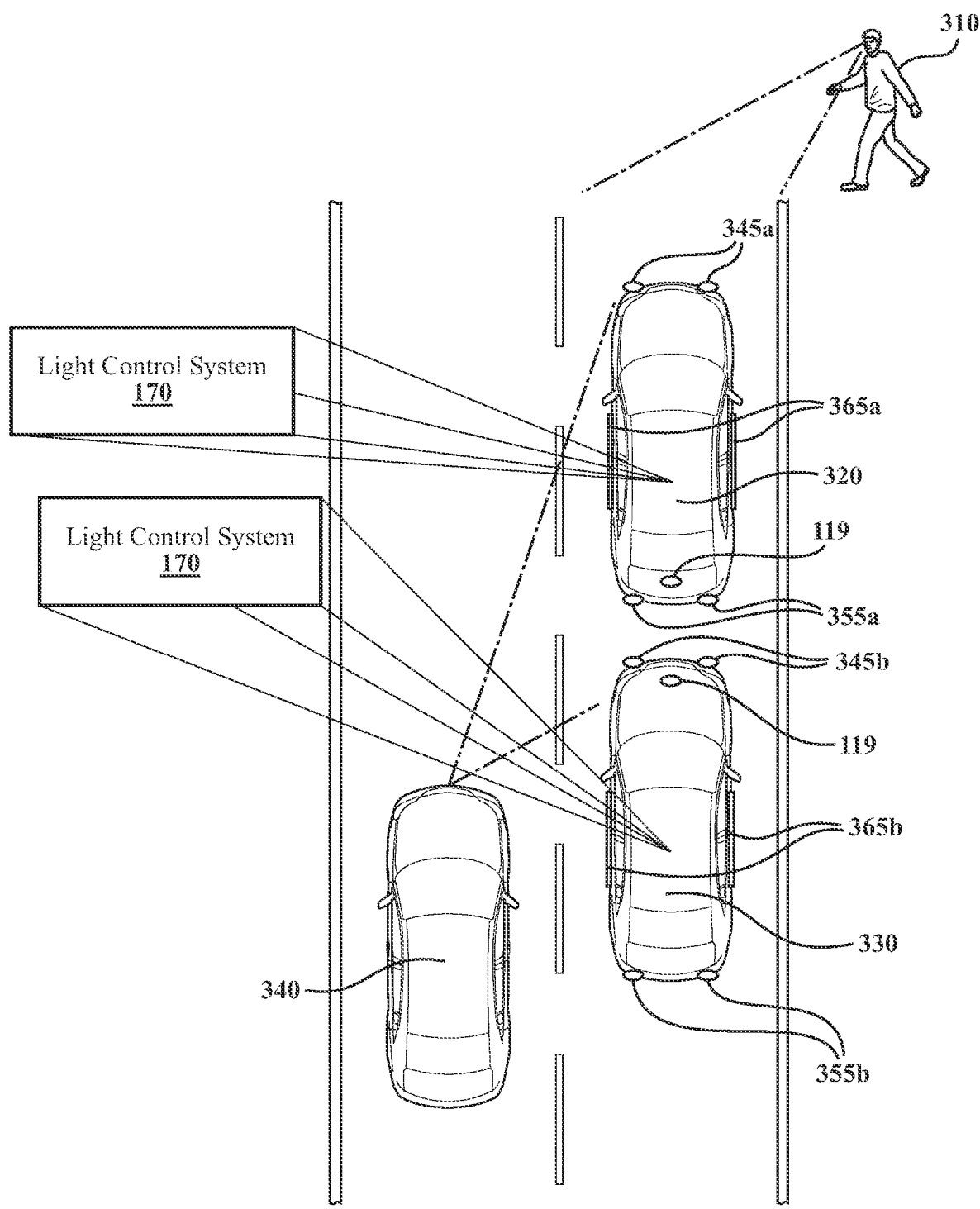
FIG. 3 illustrates one example of controlling the exterior lighting elements of a vehicle to indicate a virtual connection.

FIG. 3 illustrates one example of controlling the exterior lighting elements of a vehicle to indicate a virtual connection. As described above, a virtual connection exists when a first vehicle 320, which may also be referred to as a lead vehicle, at least partially controls the movement of a second vehicle 330, which may also be referred to as a following vehicle. The first vehicle 320 and the second vehicle 330 are examples of the vehicle 100 described in connection with FIG. 1. In this example, the second vehicle 330 will follow the trajectory of the first vehicle 320 based on control signals received at the second vehicle 330 from the first vehicle 320. In FIG. 3, the virtual connection is indicated as a dashed line between the first vehicle 320 and the second vehicle 330.

As the virtually-connected vehicles travel along a particular roadway, they will encounter various other road users, such as a pedestrian 310 and other vehicles 340. While other road users are familiar with vehicles traveling on roadways, such road users may be unfamiliar with virtual connection/hitchless towing configurations. As such, other road users may be confused or unaware of this configuration. This lack of awareness and/or confusion may lead to a dangerous situation for road users, the virtually-connected vehicles, and other bystanders. For example, a pedestrian 310 or a motorist in another vehicle 340 may be unaware of the virtual connection and may thus behave accordingly. Accordingly, the first vehicle 320, the second vehicle 330, or both, may include a light control system 170 to, as described above, 1) detect when the respective vehicle is in a virtual connection mode with another vehicle and 2) control an exterior lighting element of the vehicle as described herein to indicate the virtual connection.

As described above, a vehicle 100 may include a variety of exterior lighting elements, including headlights 345a, 345b, taillights 355a, 355b, and side panel displays 365a, 365b. A vehicle 100 may include other lighting elements such as turn indicators, undercarriage lights, and front panel displays, among others. The light control system 170 controls the emanation of light from the lighting elements to uniquely identify the virtual connection. That is, each of these exterior lighting elements, when the vehicle is in a non-virtual connection mode, may illuminate based on specific illumination parameters. The light control system 170, based on a detected virtual connection between the vehicles, controls the exterior lighting elements using different parameters such that the exterior lighting elements emanate light in a manner that is uniquely associated with the virtual connection.

FIG. 3 particularly depicts the side panel displays 365a, 365b which may be one of a variety of types, including a light-emitting diode (LED) display. In this example, the light control system 170 may control the presentation of information on the side panel display 365a. 365b in a coordinated fashion with the side panel display of the other virtually-connected vehicle to indicate the virtual connection. In one example, a coordinated message may be presented on the side panel displays 365a, 365b of the respective first and second vehicles. For example, the side panel display 365a of a lead vehicle 320 may display a first portion of a textual message while the side panel display 365*b* of the following vehicle 330 displays the remaining portion. For example, the side panel display 365*a* of the lead vehicle may display the phrase "lead vehicle." while the side panel display 365*b* of the following vehicle may display the phrase "following vehicle."

In a second example, the coordinated message may scroll across the side panel displays of the lead vehicle and the following vehicle in sequence. That is, the message may scroll across the side panel display 365*a* of the first vehicle 320 and continue along the side panel display 365*b* of the second vehicle 330.

As described above, the control of the exterior lighting elements of one vehicle is coordinated with the control of the exterior lighting elements of the other vehicle. In one example, this may mean that the light control systems 170 in either vehicle in the virtual connection communicate in some fashion in generating the respective exterior lighting element control signals.

FIG. 4 illustrates one embodiment of the light control system 170 of FIG. 2 in a cloud-computing environment. As depicted in FIG. 4 and as described above, each of the first vehicle 320 and the second vehicle 330 may be equipped with the light control system 170 to execute coordinated exterior lighting element control. While FIG. 4 depicts the light control system 170 being present on both vehicles, 320, 330 in the virtual connection, in some examples, just one of the vehicles may incorporate the light control system 170. In an example, the light control system 170 of the one vehicle may control the exterior lighting elements of that vehicle. In an example, the light control system 170 of the one vehicle may control the exterior lighting elements of that vehicle as well as other vehicles in the virtual connection configuration.

Also as described above, each vehicle may be connected to a network 405, which allows for communication between the vehicle 100 and cloud servers (e.g., cloud server 410), infrastructure devices (e.g., infrastructure device 440), other vehicles (e.g., vehicle 340), and any other systems connected to network 405. With respect to network 405, such a network may use any form of communication or networking to exchange data, including but not limited to the Internet, Directed Short Range Communication (DSRC) service, LTE, 5G, millimeter wave (mmWave) communications, and so on.

The cloud server 410 is shown as including a processor 415 that may be a part of the light control system 170 through network 405 via communication system 435. In one embodiment, the cloud server 410 includes a memory 420 that stores a communications module 425. The memory 420 is a random-access memory (RAM), read-only memory (ROM), a hard-disk drive, a flash memory, or other suitable memory for storing the communications module 425. The communications module 425 is, for example, computer-readable instructions that when executed by the processor 415 cause the processor 415 to perform the various functions disclosed herein. Moreover, in one embodiment, cloud server 410 includes the data store 430. The data store 430 is, in one embodiment, an electronic data structure stored in the memory 420 or another data store and that is configured with routines that can be executed by the processor 415 for analyzing stored data, providing stored data, organizing stored data, and so on.

The infrastructure device 440 is shown as including a processor 445 that may be a part of the light control system 170 through network 405 via communication system 465. In one embodiment, the infrastructure device 440 includes a memory 450 that stores a communications module 455. The memory 450 is a random-access memory (RAM), read-only memory (ROM), a hard-disk drive, a flash memory, or other suitable memory for storing the communications module 455. The communications module 455 is, for example, computer-readable instructions that when executed by the processor 445 cause the processor 445 to perform the various functions disclosed herein. Moreover, in one embodiment, infrastructure device 440 includes the data store 460. The data store 460 is, in one embodiment, an electronic data structure stored in the memory 450 or another data store and that is configured with routines that can be executed by the processor 445 for analyzing stored data, providing stored data, organizing stored data, and so on.

Accordingly, in addition to information obtained from sensor data 250, the light control system 170 may obtain information from cloud servers (e.g., cloud server 410), infrastructure devices (e.g., infrastructure device 440), other vehicles (e.g., vehicle 340), and any other systems connected to network 405. For example, network 405 may be used to convey light activation signals from one vehicle to the other vehicle, such that each vehicle may coordinate its exterior lighting commands accordingly.

Figure 5:
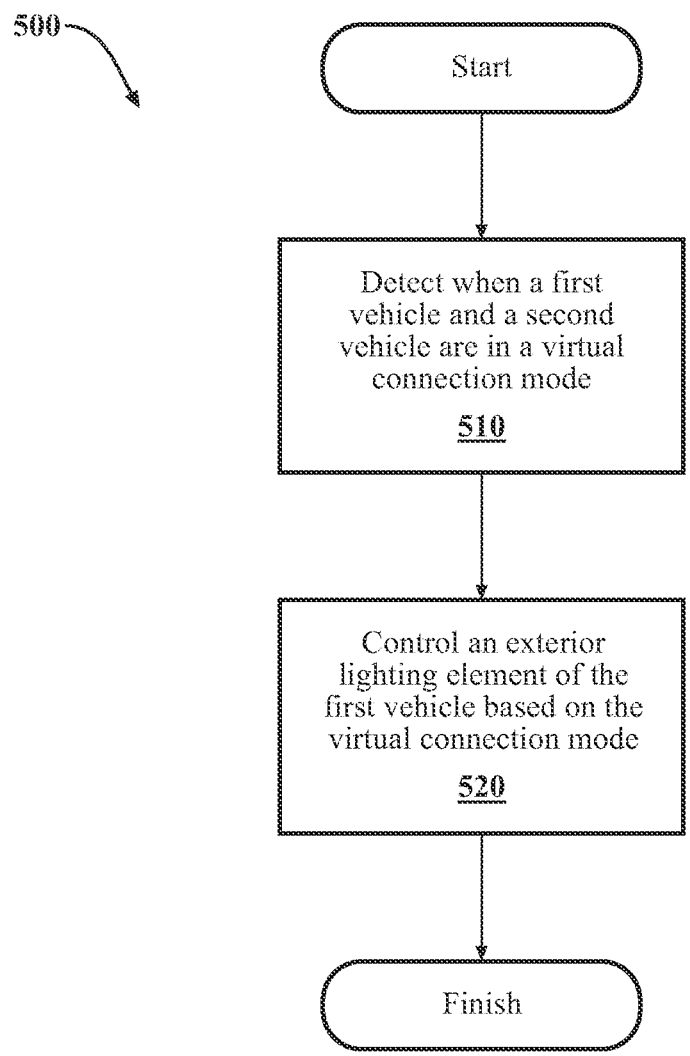
FIG. 5 illustrates one embodiment of a method for notifying users of a virtual connection by controlling the exterior lighting elements of virtually-connected vehicles.

Additional aspects of generating virtual connection-based lighting control will be discussed in relation to FIG. 5. FIG. 5 illustrates a flowchart of a method 500 that is associated with controlling exterior light elements based on a detected virtual connection. Method 500 will be discussed from the perspective of the light control system 170 of FIGS. 1 and 2. While method 500 is discussed in combination with the light control system 170, it should be appreciated that the method 500 is not limited to being implemented within the light control system 170 but is instead one example of a system that may implement the method 500.

At step 510, the detection module 220 detects that a first vehicle 320 and a second vehicle 330 are in a virtual connection mode. As described above, a virtual connection mode of a vehicle 100 refers to when the vehicle 100 is either 1) a lead vehicle providing control functions to other vehicles in a hitchless towing, virtual towing, or platooning configuration or 2) a following vehicle that is receiving control commands from a lead vehicle. This may be detected in any number of ways, for example, by identifying a state of the vehicle 100 based on information stored in memory or by detecting a virtual connection communication path between the vehicle 100 and another vehicle.

At step 520, the command module 230 controls an exterior lighting element of the first vehicle based on the virtual connection mode. That is, the first vehicle may include any number of exterior lights and the light control system 170 of the present specification may control the lighting element parameters such that the controlled exterior lighting element emanates light in a manner that uniquely identifies the virtual connection mode and that is distinct from lighting element operation in a non-virtual connection mode. In one example, controlling the exterior lighting element may include controlling a projector mounted on a vehicle 100 in the virtual connection to project information, such as a virtual connection notification, images, text, and/or navigational instructions, onto the other vehicle in the virtual connection.

As such, the present light control system 170 provides a coordinated visual indication of the virtual connection in a way that is unique to the virtual connection mode of a vehicle 100. Such a system reduces the likelihood of a dangerous situation that may arise from adjacent users being confused by, unfamiliar with, or unaware of virtually-connected vehicles in their immediate vicinity.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the light control system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the light control system 170, and/or the automated driving module(s) 160 may control some or all of these vehicle systems 140 and, thus, may be partially or fully autonomous.

The processor(s) 110, the light control system 170, and/or the automated driving module(s) 160 can be operatively connected to communicate with the various vehicle systems 140 and/or individual components thereof. For example, returning to FIG. 1, the processor(s) 110, the light control system 170, and/or the automated driving module(s) 160 can be in communication to send and/or receive information from the various vehicle systems 140 to control the movement, speed, maneuvering, heading, direction, etc. of the vehicle 100. The processor(s) 110, the light control system 170, and/or the automated driving module(s) 160 may control some or all of these vehicle systems 140.

The processor(s) 110, the light control system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the light control system 170, and/or the automated driving module(s) 160 can control the direction and/or speed of the vehicle 100. The processor(s) 110, the light control system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the light control system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
when a first vehicle is at least partially controlling a movement of a second vehicle, control an exterior lighting element of the first vehicle to project, onto a body of the second vehicle, a predetermined pattern indicating that the first vehicle is at least partially controlling the movement of the second vehicle.

2. The system of claim 1, wherein the first vehicle is one of:
a lead vehicle; and
a following vehicle.

3. The system of claim 1, wherein:
the machine-readable instructions further comprise an instruction that, when executed by the processor, causes the processor to control a second exterior lighting element of the first vehicle to illuminate in a particular pattern and in coordination with the second vehicle to indicate that the first vehicle is at least partially controlling the movement of the second vehicle; and
the second exterior lighting element is one of a headlight, a taillight, a turn light, a reverse light, a projector, a panel display, and an undercarriage light.

4. The system of claim 3, wherein the instruction to control the second exterior lighting element comprises at least one of:
an instruction that, when executed by the processor, causes the processor to activate the second exterior lighting element to emanate a color uniquely associated with the first vehicle at least partially controlling the movement of the second vehicle; and
an instruction that, when executed by the processor, causes the processor to activate the second exterior lighting element to emanate a patterned beam uniquely associated with the first vehicle at least partially controlling the movement of the second vehicle.

5. The system of claim 1, wherein the instruction to project the predetermined pattern comprises an instruction that, when executed by the processor, causes the processor to project an image indicating that the first vehicle is at least partially controlling the movement of the second vehicle.

6. The system of claim 1, wherein the machine-readable instructions further comprise an instruction that, when executed by the processor, causes the processor to project navigational instructions onto the second vehicle.

7. The system of claim 1, wherein the machine-readable instructions further comprise an instruction that, when executed by the processor, causes the processor to project a replication of a heads-up display of the first vehicle onto the second vehicle.

8. The system of claim 3, wherein the instruction to control the second exterior lighting element comprises an instruction that, when executed by the processor, causes the processor to selectively activate a side panel display of the first vehicle in coordination with a side panel display of the second vehicle to generate a coordinated message across the first vehicle and the second vehicle.

9. The system of claim 3, wherein the machine-readable instructions comprise an instruction that, when executed by the processor, causes the processor to generate an audible signal coordinated with the particular pattern.

10. The system of claim 1, wherein the instruction that, when executed by the processor, causes the processor to control the exterior lighting element of the first vehicle to project the predetermined pattern comprises an instruction that, when executed by the processor, causes the processor to control the exterior lighting element of the first vehicle to project an alphanumeric indication that the first vehicle is at least partially controlling the movement of the second vehicle.

\* \* \* \* \*